(12) United States Patent
Park et al.

(10) Patent No.: US 11,936,065 B2
(45) Date of Patent: Mar. 19, 2024

(54) SEPARATOR INCLUDING POLYETHYLENE WITH HIGHLY ENTANGLED POLYMER CHAINS, AND ELECTROCHEMICAL DEVICE INCLUDING THE SAME

(71) Applicant: LG CHEM, LTD., Seoul (KR)

(72) Inventors: Su-Jin Park, Daejeon (KR); Sang-Joon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 334 days.

(21) Appl. No.: 17/056,919

(22) PCT Filed: Jul. 12, 2019

(86) PCT No.: PCT/KR2019/008682
§ 371 (c)(1),
(2) Date: Nov. 19, 2020

(87) PCT Pub. No.: WO2020/013671
PCT Pub. Date: Jan. 16, 2020

(65) Prior Publication Data
US 2021/0210818 A1 Jul. 8, 2021

(30) Foreign Application Priority Data
Jul. 13, 2018 (KR) .................. 10-2018-0081893

(51) Int. Cl.
*H01M 50/417* (2021.01)
*C08J 9/26* (2006.01)
(Continued)

(52) U.S. Cl.
CPC ............. *H01M 50/417* (2021.01); *C08J 9/26* (2013.01); *C08J 9/365* (2013.01);
(Continued)

(58) Field of Classification Search
CPC ............. H01M 50/417; H01M 50/489; H01M 50/403; H01M 50/491; H01M 50/46;
(Continued)

(56) References Cited

U.S. PATENT DOCUMENTS

2009/0219672 A1* 9/2009 Masuda ................... H01G 9/02
361/502
2010/0285348 A1 11/2010 Murata et al.
(Continued)

FOREIGN PATENT DOCUMENTS

| CN | 101635341 A | 1/2010 |
| CN | 102473887 A | 5/2012 |

(Continued)

OTHER PUBLICATIONS

Crow, Entanglement Molecular Weights, 2022, Polymer Properties Database, (https://polymerdatabase.com/polymer%20physics/Ne%20Table.html) (Year: 2022).*

(Continued)

*Primary Examiner* — Sean P Cullen
(74) *Attorney, Agent, or Firm* — Birch, Stewart, Kolasch & Birch, LLP

(57) ABSTRACT

A separator for an electrochemical device including a porous substrate made of a porous polymer material. The separator substrate has a small thickness, excellent resistance characteristics, ion conductivity, and high mechanical strength. When the separator is applied to a battery, it is possible to improve the output characteristics of the battery.

14 Claims, 2 Drawing Sheets

(51) Int. Cl.
  *C08J 9/36* (2006.01)
  *H01M 10/0525* (2010.01)
  *H01M 50/403* (2021.01)
  *H01M 50/443* (2021.01)
  *H01M 50/451* (2021.01)
  *H01M 50/46* (2021.01)
  *H01M 50/489* (2021.01)
  *H01M 50/491* (2021.01)

(52) U.S. Cl.
  CPC ..... *H01M 10/0525* (2013.01); *H01M 50/403* (2021.01); *H01M 50/443* (2021.01); *H01M 50/451* (2021.01); *H01M 50/46* (2021.01); *H01M 50/489* (2021.01); *H01M 50/491* (2021.01); *C08J 2201/0462* (2013.01); *C08J 2323/06* (2013.01); *C08J 2401/28* (2013.01)

(58) Field of Classification Search
  CPC ...... H01M 50/443; H01M 50/451; C08J 9/26; C08J 9/365
  USPC .......................................... 429/144, 251, 254
  See application file for complete search history.

(56) References Cited

U.S. PATENT DOCUMENTS

| | | | |
|---|---|---|---|
| 2011/0311856 A1* | 12/2011 | Matsui | H01M 50/451 429/144 |
| 2012/0115008 A1 | 5/2012 | Sano et al. | |
| 2014/0315065 A1 | 10/2014 | Mizuno et al. | |
| 2015/0372277 A1* | 12/2015 | Honda | H01M 50/426 429/145 |
| 2016/0204406 A1 | 7/2016 | Ryu et al. | |
| 2017/0155123 A1* | 6/2017 | Hasegawa | B32B 27/281 |
| 2017/0288193 A1 | 10/2017 | Kong et al. | |
| 2017/0331094 A1 | 11/2017 | Lee et al. | |
| 2019/0198836 A1 | 6/2019 | Ishihara | |

FOREIGN PATENT DOCUMENTS

| | | | | |
|---|---|---|---|---|
| CN | 103717390 A | | 4/2014 | |
| CN | 103814460 A | | 5/2014 | |
| JP | 2003020357 A | * | 1/2003 | |
| JP | 2017128639 A | * | 7/2017 | |
| KR | 10-1378051 B1 | | 3/2014 | |
| KR | 10-2014-0071095 A | | 6/2014 | |
| KR | 10-2015-0052800 A | | 5/2015 | |
| KR | 10-2015-0076897 A | | 7/2015 | |
| KR | 10-2016-0048697 A | | 5/2016 | |
| KR | 10-2017-0019522 A | | 2/2017 | |
| KR | 10-2017-0040008 A | | 4/2017 | |
| KR | 10-2017-0114171 A | | 10/2017 | |
| WO | WO-2004024809 A1 | * | 3/2004 | ............ B29C 55/18 |
| WO | WO 2018/043335 A1 | | 3/2018 | |

OTHER PUBLICATIONS

European Search Report for Appl. No. 19833777.6 dated Aug. 9, 2021.

International Search Report (PCT/ISA/210) issued in PCT/KR2019/008682, dated Oct. 28, 2019.

Polymer Properties Database (https://polymerdatabase.com/polymer%20physics/Ne%20Table.html), 2015.

* cited by examiner

SEPARATOR INCLUDING POLYETHYLENE WITH HIGHLY ENTANGLED POLYMER CHAINS, AND ELECTROCHEMICAL DEVICE INCLUDING THE SAME

TECHNICAL FIELD

The present application claims priority to Korean Patent Application No. 10-2018-0081893 filed on Jul. 13, 2018 in the Republic of Korea. The present disclosure relates to a separator for an electrochemical device. The electrochemical device may be a primary battery or secondary battery, and the secondary battery includes a lithium ion secondary battery.

BACKGROUND ART

As technical development and demand of mobile instruments have been increased, secondary batteries have been increasingly in demand. Recently, use of secondary batteries has been actualized as power sources for electric vehicles (EV), hybrid electric vehicles (HEV), or the like. Therefore, many studies have been conducted for secondary batteries capable of meeting various needs. Particularly, lithium secondary batteries, having high energy density, high discharge voltage and output stability, have been increasingly in demand. Particularly, it is required for lithium secondary batteries used as power sources for electric vehicles and hybrid electric vehicles to have high-output characteristics with which they can realize a high output in a short time.

Polyolefin-based microporous membranes used conventionally for separators for electrochemical devices show severe heat shrinking behavior at a temperature of 100° C. or more due to their material properties and processing characteristics, including elongation (orientation), and thus cause the problem of short-circuit generation. To overcome this, recently, there has been suggested a separator including a porous substrate, such as a polyolefin-based microporous membrane, having a plurality of pores, and a porous coating layer formed on at least one surface of the porous substrate and including a mixture of filler particles, such as inorganic particles, with a binder polymer. However, in this case, the separator undesirably shows increased thickness due to the addition of the porous coating layer and causes degradation of resistance characteristics due to the binder polymer.

Meanwhile, in order to solve the problem of degradation of insulation property of a separator caused by current leakage, the polyolefin-based porous substrate has been controlled to a low level of porosity, pore size and air permeability, and thus shows low ion conductivity, which functions as a factor inhibiting realization of a high-output battery. Under these circumstances, there is a need for developing a novel separator, considering batteries provided with high energy density, improved output characteristics and safety.

DISCLOSURE

Technical Problem

The present disclosure is directed to providing a separator which has a small thickness and shows excellent resistance characteristics and ion conductivity. The present disclosure is also directed to providing an electrochemical device including the separator and having improved output characteristics. It will be easily understood that the objects and advantages of the present disclosure may be realized by the means shown in the appended claims and combinations thereof.

Technical Solution

According to the first embodiment of the present disclosure, there is provided a separator for an electrochemical device which includes a porous substrate, wherein the porous substrate includes polyethylene, the polyethylene has an entangle molecular weight (le) of 2,500 g/mol or less, and the porous substrate has a porosity of 40% to 70%.

According to the second embodiment of the present disclosure, there is provided the separator for an electrochemical device as defined in the first embodiment, wherein the porous substrate has a resistance of 0.5 ohm or less.

According to the third embodiment of the present disclosure, there is provided the separator for an electrochemical device as defined in the first embodiment, wherein the porous substrate has a penetration strength of 490 gf or more.

According to the fourth embodiment of the present disclosure, there is provided the separator for an electrochemical device as defined in any one of the first to the third embodiments, wherein the porous substrate has at least two peaks in the range of 130° C. to 60° C. upon the initial temperature-rising in a differential scanning calorimetry curve.

According to the fifth embodiment of the present disclosure, there is provided the separator for an electrochemical device as defined in the fourth embodiment, wherein the two peaks include a first peak at 130° C. to 145° C. and a second at 145° C. to 160° C.

According to the sixth embodiment of the present disclosure, there is provided the separator for an electrochemical device as defined in any one of the first to the fifth embodiments, wherein the porous substrate has an A value of 50% or more as calculated by the following Formula 4 in a differential scanning calorimetry curve, wherein $\Delta H1$ represents heat flow upon the initial scanning and $\Delta H2$ represents heat flow upon the second or later scanning:

$$A(\%)=(\Delta H1-\Delta H2)/\Delta H2B. \qquad \text{[Formula 4]}$$

According to the seventh embodiment of the present disclosure, there is provided the separator for an electrochemical device as defined in any one of the first to the sixth embodiments, wherein the porous substrate has a pore diameter of 10 nm to 70 nm.

According to the eighth embodiment of the present disclosure, there is provided the separator for an electrochemical device as defined in any one of the first to the seventh embodiments, wherein the porous substrate has a thickness of 5 μm to 14 μm.

According to the ninth embodiment of the present disclosure, there is provided the separator for an electrochemical device as defined in any one of the first to the eighth embodiments, which has an inorganic coating layer formed on at least one surface of the porous substrate, wherein the inorganic coating layer includes inorganic particles and a binder resin, and the inorganic particles and the binder resin are present in the inorganic coating layer at a weight ratio of 99.9:0.1 to 90:10.

According to the tenth embodiment of the present disclosure, there is provided the separator for an electrochemical device as defined in the ninth embodiment, wherein the separator having a inorganic layer coated on the surface has a resistance of 0.55 ohm or less.

According to the eleventh embodiment of the present disclosure, there is provided the separator for an electrochemical device as defined in the ninth or the tenth embodiment, wherein the inorganic coating layer has a thickness of 2.5 μm or less.

According to the twelfth embodiment of the present disclosure, there is provided an electrode assembly for electrochemical device including a negative electrode, a positive electrode and a separator interposed between the negative electrode and the positive electrode, wherein the separator is the same as defined in any one of the first to the eleventh embodiments, and the inorganic coating layer of the separator may be disposed in such a manner that it may face the positive electrode.

According to the thirteenth embodiment of the present disclosure, there is provided a method for manufacturing the separator as defined in any one of the first to the eighth embodiments, which includes preparing the porous substrate by carrying out thermal fixing at a temperature of 130° C. or higher.

According to the fourteenth embodiment of the present disclosure, there is provided a method for manufacturing the separator as defined in any one of the ninth to the eleventh embodiments, the method including the steps of: preparing a slurry for an inorganic coating layer including a binder resin, a dispersion medium and inorganic particles; and applying the slurry to at least one surface of the porous substrate, followed by drying the porous substrate having the slurry on at least one surface, wherein the porous substrate is prepared by carrying out thermal fixing at a temperature of 130° C. or higher.

According to the fifteenth embodiment of the present disclosure, there is provided a method for manufacturing the separator as defined in the fourteenth embodiment, wherein the slurry is prepared in the form of aqueous slurry including a polymer resin and inorganic particles dispersed in a dispersion medium including water and/or ethanol.

Advantageous Effects

The separator according to the present disclosure includes a porous polymer membrane as a porous substrate, and the porous substrate has high porosity and excellent mechanical strength. Therefore, it is possible to provide excellent resistance characteristics and to allow thin filming of a separator. In addition, the separator has excellent durability to prevent damages caused by external impact, or the like. Thus, the battery including the separator according to the present disclosure can ensure low resistance and high ion conductivity, and thus can provide improved output characteristics.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
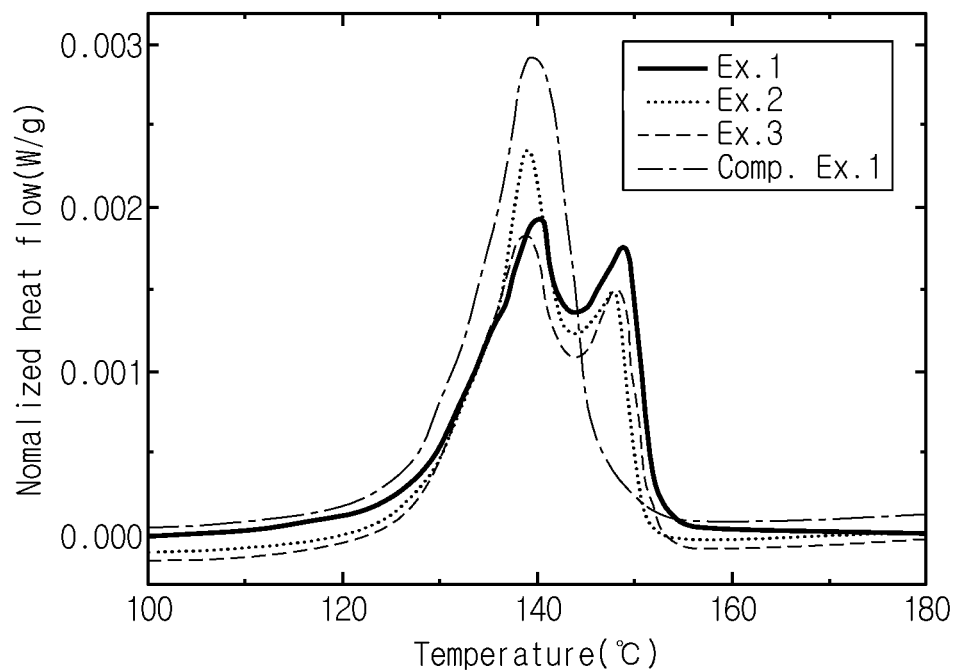
FIG. 1 shows the analysis results of differential scanning calorimetry (DSC) of Examples 1-1 to 1-3.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part ⌜includes⌟ an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

In one aspect, there is provided a separator for an electrochemical device. Herein, the electrochemical device is a system in which chemical energy is converted into electrical energy through electrochemical reactions, has a concept including a primary battery and a secondary battery, wherein the secondary battery is capable of charging and discharging and has a concept covering a lithium ion battery, nickel-cadmium battery, nickel-metal hydride battery, or the like.

1. Separator

The separator according to the present disclosure functions as an ion-conducting barrier which allows ions to pass therethrough while interrupting an electrical contact between a negative electrode and a positive electrode. The separator has a plurality of pores formed therein, and the pores are interconnected preferably so that gases or liquids may pass from one surface of the separator to the other surface of the separator. The separator according to the present disclosure includes a porous substrate including a plurality of pores. According to an embodiment of the present disclosure, the separator may further include an inorganic coating layer disposed on at least one surface of the porous substrate. The inorganic coating layer includes inorganic particles and a binder resin, and may have a porous structure including pores derived from the interstitial volumes formed between the inorganic particles. According to the present disclosure, the porous substrate may include a porous polymer film including a polymer material, wherein the porous substrate shows a resistance of 0.5 ohm or less. In addition, when the inorganic coating layer is formed on at least one surface of the porous substrate, the separator shows an increase in resistance of 0.05 ohm or less, as compared to the resistance of the porous substrate. In other words, the separator according to the present disclosure is characterized in that it is controlled to a resistance of 0.55 ohm or less.

Meanwhile, according to an embodiment of the present disclosure, when the separator is applied to a jelly-roll electrode assembly formed by winding an electrode assembly sheet, the inorganic coating layer may be formed on one surface of the porous substrate, wherein the inorganic coating layer may face a positive electrode. For example, the jelly-roll type electrode assembly includes a first separator/positive electrode/second separator/negative electrode, laminated successively, to form an electrode assembly sheet, wherein the first and the second separators have an inorganic coating layer merely on the portion facing the positive electrode and the electrode assembly sheet is wound in such a manner that the first separator may face the inner side of the jelly-roll. When winding the electrode assembly sheet, a winding core is disposed on the side of the first separator and the electrode assembly sheet is wound around the winding core in order to prevent meandering and dewinding of the sheet and to facilitate the winding process. Finally, when the jelly-roll type electrode assembly is finished, the winding core is removed from the center of the electrode assembly. If the winding core is in contact with the inorganic coating layer, the inorganic coating layer may be damaged during the removal of the winding core. Thus, in this case, the inorganic coating layer is formed merely on the portion of the separator facing the positive electrode. In addition, when the inorganic coating layer is formed merely on the portion of the first separator facing the positive electrode, it is preferred to form an inorganic coating layer merely on the portion facing the positive electrode also in the case of the second separator in order to provide the same interfacial effect in the electrode assembly.

The separator according to the present disclosure has a small thickness, and thus can improve the energy density of a battery when it is applied to the battery. In addition, it is possible to improve the output characteristics of an electrochemical device, such as an electric vehicle, requiring high output, by virtue of excellent resistance characteristics and ion conductivity.

According to an embodiment of the present disclosure, when the separator includes an inorganic coating layer, the inorganic coating layer may be present in an amount of 3 vol % to 40 vol % based on 100 vol % of the total volume of the separator. In addition to this or independently from this, the inorganic coating layer may have a thickness corresponding to 5% to 50% based on the total thickness of the separator.

2. Porous Substrate

The separator according to the present disclosure includes a porous substrate. According to the present disclosure, the porous substrate has a uniform pore size and high porosity, and thus can contribute to improvement of resistance characteristics and ion conductivity. In addition, the porous substrate has high porosity and mechanical strength, and thus can allow thin filming of the separator to a desired level.

According to an embodiment of the present disclosure, the porous substrate may have a porosity of 40-70%. For example, the porosity may be 42% or more, 45% or more, 50% or more, or 55% or more, within the above-defined range. In addition, the porosity may be 60% or less, 55% or less, or 50% or less, within the above-defined range. For example, the porosity may be 40-65%.

The term 'porosity' means a ratio of volume occupied by pores based on the total volume of a given structure, is expressed in the unit of %, and may be used interchangeably with the term of pore ratio or porous degree. According to the present disclosure, the porosity may be determined by any method with no particular limitation. For example, the porosity may be determined by using the Brunauer-Emmett-Teller (BET) method using nitrogen gas or Hg intrusion porosimetry and according to ASTM D-2873. For example, the net density of a separator is calculated from the density (apparent density) of the separator and the compositional ratio of ingredients contained in separator and density of each ingredient. Then, the porosity of the separator may be calculated from the difference between the apparent density and the net density.

Meanwhile, the pores of the porous substrate may have a diameter of about 10-70 nm based on the largest diameter thereof. Within the above-defined range, the diameter may be 65 nm or less, or 60 nm or less. Considering improvement of the resistance characteristics of a separator, it is preferred that the separator has a uniform pore size and uniform pore distribution in the separator. Thus, according to the present disclosure, it is possible to provide excellent resistance characteristics, when the pore size is uniform and the pore distribution is also uniform, while satisfying the above-defined range of pore diameter. Meanwhile, according to an embodiment of the present disclosure, the pores of the porous substrate may have a mean pore size of 15-50 nm. Within the above-defined range, the mean pore size may be 20 nm or more, 25 nm or more, or 30 nm or more, and 40 nm or less, or 35 nm or less. For example, the porous substrate may have a mean pore size of 30-35 nm.

According to an embodiment of the present disclosure, the pore size, pore distribution and mean pore size (nm) may be determined by using a capillary flow porometer. This is based on wetting the pores of a separator with a liquid having a known surface tension value, applying pneumatic pressure thereto, and measuring the pressure (bubble point=max pore) where the initial flux is generated. Particular examples of such a capillary flow porometer include CFP-1500-Ae available from Porous Materials, Co.

In addition, according to an embodiment of the present disclosure, the porous substrate may have a penetration strength of 490 gf or more, preferably 530 gf or more, with a view to mechanical strength. According to an embodiment of the present disclosure, the penetration strength refers to the maximum penetration load (gf) as determined by carrying out a penetration test by using INSTRON® UTM system under the conditions of a needle tip radius of curvature of 0.5 mm and a puncture rate of 50 mm/sec.

The porous substrate according to the present disclosure may have a thickness of 5 μm-14 μm with a view to thin filming and high energy density of an electrochemical device. According to an embodiment of the present disclosure, the porous substrate may have a thickness of 11 μm or more, considering mechanical properties and/or functions as a conducting barrier, and a thickness of about 14 μm or less, considering thin filming and/or resistance of the separator. For example, the porous substrate may have a thickness controlled adequately within a range of 11 μm-14 μm.

As mentioned above, the porous substrate according to the present disclosure has excellent mechanical strength while having a small thickness. In addition, the porous substrate has a uniform pore size and high porosity, and thus can provide improved resistance characteristics and ion conductivity. According to an embodiment of the present disclosure, the porous substrate may have an ion conductivity of at least 1.0E-05 S/cm (1×10$^{-5}$ S/cm), 1.0E-04 S/cm (1×10$^{-4}$ S/cm), or 1.0E-03 S/cm (1×10$^{-3}$ S/cm). In addition to this or independently from this, the porous substrate shows a resistance of 0.5 ohm or less.

According to the present disclosure, the porous substrate includes a polymer resin having electrical insulation property, and preferably includes a thermoplastic resin with a view to imparting a shut-down function. Herein, the term 'shut-down function' means a function of preventing thermal runaway of a battery by allowing a polymer resin to be molten so that the pores of the porous substrate may be closed and ion conduction may be interrupted, when the battery temperature is increased. In this context, the porous substrate preferably includes a polyolefin-based polymer resin having a melting point less than 200° C. For example, the polyolefin-based polymer resin may include at least one selected from polyethylene, polypropylene and polypentene. According to an embodiment of the present disclosure, the porous substrate may include polyethylene in an amount of 90 wt % or more, such as 100 wt %.

According to the present disclosure, 'polyethylene' may refer to ultrahigh-molecular weight high-density polyethylene (UHMWHDPE), high-molecular weight polyethylene (HMWPE), high-density polyethylene (HDPE), low-density polyethylene (LDPE), homogeneous linear and linear low-density polyethylene (LLDPE), or the like, and may include at least one selected therefrom. Herein, 'high-molecular weight polyethylene (HMWPE)' may refer polyethylene having a weight average molecular weight (Mw) of 100,000-1,000,000. In addition, 'ultrahigh molecular weight' may refer to a weight average molecular weight (Mw) larger than about 1,000,000 and equal to or less than about 7,000,000. Preferably, the polyethylene may have a Mw of 200,000-1,000,000, such as 200,000-500,000.

According to an embodiment of the present disclosure, the polyolefin-based polymer resin may have an entangle molecular weight (Me) of 2,500 g/mol or less, preferably 2,000 g/mol or less, considering the mechanical strength of the porous substrate. Herein, 'Me' means the average molecular weight between segments of a polymer. A lower Me value means that segments are close to each other, i.e. polymer chains are highly entangled. According to an embodiment of the present disclosure, the polyolefin-based polymer resin includes polyethylene and the polyethylene has an entangle molecular weight of 2,500 g/mol or less, preferably 2,000 g/mol or less. According to the present disclosure, Me may be determined through a method using light scattering, a method of measuring a plateau modulus, a method of measuring the relative viscosity of a polymer solution and using entangle concentration, a method of using critical molecular weight, a method of measuring the rheological properties of a polymer, or the like.

For example, the method of using rheological properties may be calculated according to the following Formula 1-3, after applying a pressure of 10 Pa for 1,000 seconds to a polymer material molten at a high temperature of 190° C.:

$$M_e = \frac{2}{3}\rho RT J_e^0 \quad \text{[Formula 1]}$$

$$G_N^0 = \frac{4}{5}\frac{\rho RT}{M_e} \quad \text{[Formula 2]}$$

$$G_N^0 = \frac{6}{5J_e^0} \quad \text{[Formula 3]}$$

The above Formula 1 to Formula 3 show 'Doi and Edward Equation', wherein $G_N^O$ represents a plateau modulus, $J_e^O$ represents a steady-state compliance, $\rho$ represents melt density at 190° C., R is the gas constant, and T represents absolute temperature.

Meanwhile, according to an embodiment of the present disclosure, the porous substrate may further include at least one polymer resin, such as polyethylene terephthalate, polybutylene terephthalate, polyacetal, polyamide, polycarbonate, polyimide, polyetheretherketone, polyethersulfone, polyphenylene oxide, polyphenylene sulfide or polyethylene naphthalate.

According to an embodiment of the present disclosure, the porous substrate may be a porous polymer film obtained by the following method, and may be a monolayer film or multilayer film formed by lamination of two or more sheets of films. In the case of a multilayer film formed by lamination of two or more sheets of films, each layer preferably has the above-described characteristics in terms of materials.

According to an embodiment of the present disclosure, the porous substrate includes polyethylene, wherein the porous substrate shows at least two peaks at 130-160° C. upon the initial scanning in its differential scanning calorimetry (DSC). The two peaks may refer to as the first peak and the second peak, wherein the first peak means the maximum peak appearing in a graph during DSC, and the second peaks means a peak lower than the first peak. According to an embodiment of the present disclosure, the second peak means a peak lower than the first peak. According to an embodiment of the present disclosure, the first peak may appear at 130-145° C., and the second peak may appear at 145-160° C. Each peak means an inflection point where the tangential gradient of a DSC graph is changed from + to −. When two peaks appear at a temperature of 130-160° C., the porous substrate has excellent mechanical strength as compared to a porous substrate having only one peak in the same temperature range upon the initial scanning.

FIG. 1 shows the results of DSC of the porous substrates according to Examples and Comparative Examples (upon initial scanning). It can be seen from FIG. 1 that the porous substrates according to Examples 1-3 have two peaks at a temperature of 130-160° C. As a result, it can be seen that the porous substrates according to Examples and the porous substrates according to Comparative Examples have similar porosity, but the porous substrates according to Examples show significantly higher mechanical strength.

Meanwhile, according to an embodiment of the present disclosure, the porous substrate preferably has an A value of 50% or more, 70% or more, or 80% or more, as calculated by the following Formula 4, wherein ΔH1 represents heat flow upon the initial scanning and ΔH2 represents heat flow upon the second or later scanning:

$$A(\%) = (\Delta H1 - \Delta H2)/\Delta H2 \quad \text{[Formula 4]}$$

The second peak results from the structural characteristics of the porous substrate derived from the properties imparted by the thermal fixing process at a specific temperature during the manufacture of the porous substrate. In addition, it appears only upon the initial scanning in DSC analysis but is not identified upon the second or later scanning. ΔH2 determined upon the second or later scanning is not affected by the manufacturing process of the porous substrate, and substantially depends on the material characteristics of the porous substrate. In addition, ΔH1 determined upon the initial scanning is affected by both the material characteristics and structural characteristics of the porous substrate.

Herein, the DSC curve of the porous substrate may be obtained by using a known thermal analysis method, such as differential scanning calorimetry (DSC) according to JIS K 7121. According to an embodiment of the present disclosure, the DSC analysis may be carried out by scanning twice or more times in a temperature range of 30-200° C., wherein the temperature-rising and temperature-dropping rate during each time of scanning may be 10° C./min and a pause of about 10 minutes may be set between each time of temperature-rising and temperature-dropping. The determined results may be analyzed by using Pyris S/W.

3. Method for Manufacturing Porous Substrate

According to an embodiment of the present disclosure, the porous substrate may be obtained by a method for forming a polymer film, preferably a wet process. For example, the wet process includes the steps of: (S1) preparing a mixture; (S2) forming an extruded sheet; (S3) forming a film; (S4) removing a pore-forming agent; and (S5) carrying out elongation-relaxation of the film.

In step (S1), a suitable type of polymer resin is selected depending on final properties of a separator, and the selected polymer resin is mixed with a pore-forming agent. The polymer resin may be a polyolefin-based polymer resin but is not limited thereto. Particular examples of the polyolefin-based polymer resin may include any one selected from polyethylene, such as high-density polyethylene, linear low-density polyethylene, low-density polyethylene or ultrahigh-molecular weight polyethylene, polypropylene, polybutylene and polypentene, or a mixture of two or more of them.

The pore-forming agent is a material dispersed in the polymer, imparting heterogeneity to the substrate prepared through extrusion, elongation, or the like, and removed from the substrate subsequently. Therefore, the portion of the substrate, where the pore-forming agent is positioned, is left in the form of pores. The pore-forming agent is a material present preferably in a liquid state during extrusion, but may be a material maintaining a solid state. The pore-forming agent may include an aliphatic hydrocarbon solvent, such as liquid paraffin, paraffin oil, mineral oil or paraffin wax; vegetable oil, such as soybean oil, sunflower oil, rapeseed oil, palm oil, coconut oil, corn oil, grape seed oil or cottonseed oil; or a plasticizer, such as dialkyl phthalate. Particularly, the plasticizer may include di-2-ethylhexyl phthalate (DOP), di-butyl-phthalate (DBP), di-isononyl phthalate (DINP), di-isodecyl phthalate (DIDP), butyl benzyl phthalate (BBP), or the like. Among them, liquid paraffin (LP, also referred to as liquid-state paraffin) is preferred.

In addition, it is generally required that a high content of pore-forming agent is used in order to improve air permeability, when manufacturing the separator. However, an excessive amount of pore-forming agent may adversely affect the strength of the finished substrate. Therefore, the content of the pore-forming agent may be 50-80 wt %, or 60-70 wt %, based on 100 wt % of the total amount of the polymer resin with the pore-forming agent.

Next, the mixture prepared from the preceding step is extruded through an extruder. The extruder is not particularly limited and may be an extruder used conventionally in the art. Non-limiting examples of the extruder include an extruder equipped with a T-die or tubular die. The extrusion process may be carried out at an extrusion temperature used currently, but is carried out preferably at a temperature higher than the melting point of the polymer resin by 10-100° C. When the extrusion temperature is excessively higher than the above-defined range, it is difficult to form a film due to the thermal degradation of the polymer resin and the mechanical properties of the finished substrate are degraded undesirably. Extruded sheets may be obtained through the extrusion process.

Then, the extruded sheets are introduced to an elongation process. The elongation process is carried out by using a currently used elongation machine. The elongation machine that may be used includes a sequential biaxial elongation machine, but is not limited thereto. It is possible to increase the mechanical strength of the porous substrate through the elongation of the extruded sheets. The elongationprocess is carried out in the machine direction (MD, longitudinal direction) and/or transverse direction (TD, vertical direction). Through the elongation in either direction or both directions, it is possible to increase the tensile strength in the corresponding direction. If necessary, the separator according to the present disclosure may be subjected to elongation in ether of the machine direction (MD) and the transverse direction (TD) (e.g. uniaxial elongation), or in both of the machine direction (MD) and the transverse direction (TD) (e.g. biaxial elongation), sequentially or at the same time.

After that, the pore-forming gent is removed from the resultant product of step (S3). The pore-forming agent is removed through extraction using a solvent and drying. After removing the pore-forming agent, the spaces occupied by the pore-forming agent become pores. The solvent that may be used for extraction of the pore-forming agent is any solvent capable of extracting the pore-forming agent, but preferably includes a solvent, such as methyl ethyl ketone, methylene chloride or hexane, having high extraction efficiency and a high drying rate. Preferably, the solvent may be methylene chloride, such as methylene dichloride (MC). The extraction may be carried out by using any conventional solvent extraction process, such as an immersion process, solvent spray process or ultrasonication process, and such extraction processes may be used alone or in combination.

After extracting the pore-forming agent, a thermal fixing step is carried out. It is possible to obtain a finished separator having desired physical properties, porosity and air permeability through the thermal fixing step. Particularly, the film dried from the preceding step is subjected to thermal fixing in order to reduce the shrinkage of the finished film by removing the stress remaining in the film. The thermal fixing includes fixing a film and applying heat thereto so that the film to be shrunk may be fixed forcibly and the residual stress may be removed. A higher thermal fixing temperature is preferred in terms of reducing the shrinkage. However, when the thermal fixing temperature is excessively high, the film is partially molten so that the pores may be blocked and the permeability may be degraded. Preferably, the thermal fixing temperature is selected from such a temperature range that about 10-30 wt % of the crystalline portions of the film may be molten at the temperature. When the thermal fixing temperature is lower than the temperature where about 10 wt % of the crystalline portions of the film is molten, it is not possible to carry out reorientation of polyethylene molecules in the film sufficiently and to provide an effect of removing the residual stress from the film. When the thermal fixing temperature is higher than the temperature where about 30 wt % of the crystalline portions of the film is molten, the pores are blocked due to partial melting, resulting in degradation of permeability. According to an embodiment of the present disclosure, the porous substrate may include polyethylene, wherein the thermal fixing may be carried out at a temperature of 130° C. or higher, or 135° C. or higher. Preferably, the thermal fixing may be carried out at 135° C. or higher for about 30 seconds to 5 minutes. Meanwhile, the upper limit of the thermal fixing temperature may be controlled adequately, considering the melting point of the polymer material. For example, the upper limit may be controlled to 200° C. or lower. It is possible to obtain a porous substrate having high mechanical strength by controlling the thermal fixing temperature adequately as mentioned above. Meanwhile, according to an embodiment of the present disclosure, the polyethylene may have an entangle molecular weight of 2,500 g/mol of less. When the thermal fixing is carried out at a temperature of 130° C. or higher, or 135° C. or higher, as mentioned above, it is possible to obtain a porous substrate having high mechanical strength even when the porosity is increased. Meanwhile, according to an embodiment of the present disclosure, elongation may be further carried out while the thermal fixing is carried out, wherein the elongation ratio may be 1.0-1.5 times as compared to the porous substrate before the thermal fixing.

According to an embodiment of the present disclosure, the porous substrate may have a monolayer structure. In a variant, the porous substrate may be a laminate film formed by lamination of at least two sheets of films. Herein, at least one film contained in the laminate film may be formed by the above-described method.

4. Inorganic Coating Layer (1) Structure of Inorganic Coating Layer

According to an embodiment of the present disclosure, the separator may include an inorganic coating layer formed on at least one surface of the porous substrate. Herein, the inorganic coating layer may be disposed preferably in such a manner that it may face a positive electrode, when manufacturing an electrode assembly. The inorganic coating layer includes an adhesive binder resin and inorganic particles, has a plurality of micropores therein, wherein the micropores are interconnected, and shows structural characteristics as a porous layer so that gases or liquids may permeate from one surface to the other surface. According to an embodiment of the present disclosure, the inorganic coating layer may include the binder resin and the inorganic particles at a weight ratio of 0.1:99.9-10:90. The ratio may be controlled adequately within the above-defined range. For example, the binder resin may be used in an amount of 5 wt % or less, or 3 wt % or less, based on 100 wt % of the total amount of the binder resin with the inorganic particles. According to the present disclosure, the inorganic coating layer preferably has a porous structure with a view to ion permeability.

According to an embodiment of the present disclosure, the inorganic coating layer may be formed by binding the inorganic particles by means of the binder resin, wherein pores are formed by the interstitial volume among the inorganic particles. The interstitial volume is a space defined by the inorganic particles facing each other substantially in a closely packed or densely packed structure of the inorganic particles.

According to an embodiment of the present disclosure, the inorganic coating layer may have a porosity of 30-70 vol %. Within the above-defined range, the porosity may be 35 vol % or more, or 40 vol % or more. In addition to this or independently from this, the porosity may be 65 vol % or less, or 60 vol % or less. For example, the porosity may be 40-60 vol %. When the porosity is 70 vol % or less, it is possible to ensure dynamic property with which a pressing process for adhesion with an electrode can be tolerated, and to prevent an excessive increase in surface opening, thereby facilitating adhesion. Meanwhile, when the porosity is 30 vol % or more, it is possible to provide preferred ion permeability.

Meanwhile, according to the present disclosure, the inorganic coating layer may have a thickness of 3 μm or less, such as a thickness of 2.5 μm or less, or 2 μm or less.

According to the present disclosure, the inorganic coating layer may be controlled to a desired range in terms of binder content and thickness in order to provide high porosity and to retain low resistance. According to an embodiment of the present disclosure, when the separator further includes an inorganic coating layer in addition to the porous substrate, it is preferred that an increase in resistance is 0.05 ohm or less based on the porous substrate alone. In other words, the separator having an inorganic coating layer preferably shows a resistance of 0.55 ohm or less.

(2) Materials of Inorganic Coating Layer

A. Binder Resin

According to the present disclosure, non-limiting examples of the binder resin include any one polymer resin selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cyanoethylpullulan, cyanoethylpolyvinylalchol, cyanoethyl cellulose, cyanoethyl sucrose, pullulan and carboxymethyl cellulose, or a mixture of two or more of them. However, the scope of the present disclosure is not limited thereto. According to an embodiment of the present disclosure, carboxymethyl cellulose may be used as an ingredient of the binder resin independently or in combination with another ingredient in order to disperse the inorganic particles homogeneously in the inorganic coating layer.

B. Inorganic Particles

According to an embodiment of the present disclosure, the inorganic particles are not particularly limited, as long as they are electrochemically stable. In other words, the inorganic particles are not particularly limited, as long as they cause no oxidation and/or reduction in the operating voltage range (e.g. 0-5V based on Li/Li$^+$) of an applicable electrochemical device. Particularly, when using inorganic particles having a high dielectric constant, they contribute to an increase in dissociation degree of the electrolyte salt, particularly lithium salt, in a liquid electrolyte, and thus can improve ion conductivity of the electrolyte.

For these reasons, the inorganic particles may include high-dielectric constant inorganic particles having a dielectric constant of 5 or more, preferably 10 or more. Non-limiting examples of the inorganic particles having a dielectric constant of 5 or more may include $BaTiO_3$, $Pb(ZrTi)O_3$ (PZT), $Pb_{1-x}La_xZr_{1-y}Ti_yO_3$ (PLZT, wherein 0<x<1, 0<y<1), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, $Mg(OH)_2$, NiO, CaO, ZnO, $ZrO_2$, $SiO_2$, $Y_2O_3$, $Al_2O_3$, SiC, $Al(OH)_3$, $TiO_2$, or mixtures thereof.

In addition, the inorganic particles may be inorganic particles capable of transporting lithium ions, i.e. inorganic particles containing lithium elements, not storing lithium therein but transporting lithium ions. Non-limiting examples of the inorganic particles capable of transporting lithium ions include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, $0<z<3$), $(LiAlTiP)_xO_y$-based glass ($1<x<4$, $0<y<13$), such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, $P_2S_5$-based glass ($Li_xP_yS_z$, $0<x<3$, $0<y<3$, $0<z<7$), such as LiI—$Li_2S$—$P_2S_5$, or mixtures thereof.

Meanwhile, according to an embodiment of the present disclosure, the inorganic coating layer may include a hat-absorbing material as inorganic particles. The heat-absorbing material is less affected by the temperature applied during the formation of the inorganic coating layer or lamination (e.g. hot pressing) of the separator with an electrode, and thus can prevent degradation of the compressibility of the separator.

Particular examples of the heat-absorbing material include oxides and/or hydroxides containing at least one element selected from the group consisting of aluminum, magnesium, silicon, zirconium, calcium, strontium, barium, antimony, tin, zinc and rare earth elements, but are not limited thereto. More particularly, the metal oxides include alumina, aluminum peroxide, tin-zinc oxides ($Zn_2SnO_4$, $ZnSnO_3$), antimony trioxide ($Sb_2O_3$), antimony tetraoxide ($Sb_2O_4$), antimony pentaoxide ($Sb_2O_5$), or the like. The metal hydroxides include aluminum hydroxide ($Al(OH)_3$), magnesium hydroxide ($Mg(OH)_2$), zinc tin hydroxide ($ZnSn(OH)_6$), or the like.

In addition, aluminum hydroxide, a type of metal hydroxide, is decomposed into $Al_2O_3$ and water ($H_2O$) by absorbing heat at a temperature of 200° C. or higher. Herein, aluminum hydroxide absorbs a heat energy of about 1,000 J/g. In addition, magnesium hydroxide absorbs a heat energy of about 1,300 J/g. Therefore, metal hydroxide can assist an effect of preventing degradation of the shrinkage of a separator through endothermic reaction, as soon as heat corresponding to the above-mentioned heat energy is generated in an electrochemical device.

In addition, there is no particular limitation in the average particle diameter ($D_{50}$) of the inorganic particles. However, the inorganic particles preferably have an average particle diameter of 0.3-1 μm for the purpose of formation of a coating layer having a uniform thickness and adequate porosity. When the average particle diameter is smaller than 0.3 μm, the inorganic particles may have low dispersibility in slurry prepared for preparing the inorganic coating layer. When the average particle diameter is larger than 1 m, the coating layer to be formed may have an increased thickness.

(3) Method for Forming Inorganic Coating Layer

For example, the inorganic coating layer may be formed by the following method. First, slurry for an inorganic coating layer including a binder resin, a dispersion medium and inorganic particles is prepared. According to an embodiment of the present disclosure, the slurry may be prepared as aqueous slurry containing a polymer resin and inorganic particles dispersed in a dispersion medium including water and/or ethanol. According to an embodiment of the present disclosure, the dispersion medium may include a thickening aid, such as polyvinyl pyrrolidone or tannic acid. For example, the aqueous slurry may be prepared by mixing inorganic particles with a polymer emulsion formed by dispersing a polymer compound in an aqueous dispersion medium. For example, the polymer emulsion may include at least one selected from emulsion or suspension of an acrylic resin, polystyrene resin, styrene butadiene rubber (SBR), nitrile rubber (NBR), polyolefin-based resin, acetate resin, PVDF resin, PVDF-based copolymer resin, ethylene-vinyl acetate (EVA) resin, polyvinyl butyral resin, polytetrafluoroethylene (PTFE) resin, or the like.

Meanwhile, according to another embodiment of the present disclosure, the slurry for an inorganic coating layer may be prepared as organic slurry using an organic solvent. For example, the organic slurry may be prepared by the following method. First, a binder resin is dissolved in a suitable organic solvent to prepare a polymer solution. The solvent preferably has a solubility parameter similar to the solubility parameter of the binder polymer to be used and has a low boiling point. This is because such a solvent facilitates homogeneous mixing and the subsequent solvent removal. Non-limiting examples of the solvent that may be used include acetone, tetrahydrofuran, methylene chloride, chloroform, dimethyl formamide, N-methyl-2-pyrrolidone, cyclohexane, water, or a mixture thereof. Next, inorganic particles are added to and dispersed in the resultant polymer solution.

According to the present disclosure, the ratio of the inorganic particles to the binder is the same as described above and may be controlled adequately considering the thickness, pore size and porosity of the finished inorganic coating layer.

Then, the slurry for inorganic coating layer is applied to at least one surface of the separator, followed by drying. There is no particular limitation in the method for coating the slurry on the porous substrate and any conventional coating method known in the art may be used. For example, various methods, such as dip coating, die coating, roll coating, comma coating, gravure coating, doctor blade, die coating or a combination thereof may be used.

During the drying, temperature and time conditions may be set adequately so that generation of surface defects on the surface of the composite porous layer may be minimized. A drying-aid system, such as a drying oven or hot air, may be used within a suitable range.

In addition, the separator according to the present disclosure may be obtained by preparing an inorganic coating layer and a porous substrate separately, stacking the sheets, and forming a composite by hot pressing or adhesive. Methods for preparing the inorganic coating layer as an independent sheet include a method including applying the slurry onto a release sheet, forming the inorganic coating layer in the same manner as described above and removing only the inorganic coating layer.

5. Electrode Assembly Including Separator

In another aspect, there is provided a secondary battery including the separator. The battery includes a negative electrode, a positive electrode and a separator interposed between the negative electrode and the positive electrode, wherein the separator is the low-resistance separator having the above-mentioned characteristics.

According to the present disclosure, the positive electrode includes a positive electrode current collector, and a positive electrode active material layer formed on at least one surface of the current collector and containing a positive electrode active material, a conductive material and a binder resin. The positive electrode active material may include any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

According to the present disclosure, the negative electrode includes a negative electrode current collector, and a negative electrode active material layer formed on at least one surface of the current collector and containing a negative electrode active material, a conductive material and a binder resin. The negative electrode may include, as a negative electrode active material, any one selected from: lithium metal oxide; carbon such as non-graphitizable carbon or graphite-based carbon; metal composite oxides, such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, elements of Group 1, 2 or 3 in the Periodic Table, halogen; $0 < x \le 1$; $1 \le y \le 3$; $1 \le z \le 8$); lithium metal; lithium alloy; silicon-based alloy; tin-based alloy; metal oxides, such as AuO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the conductive material may be any one selected from the group consisting of graphite, carbon black, carbon fibers or metal fibers, metal powder, conductive whiskers, conductive metal oxides, activated carbon and polyphenylene derivatives, or a mixture of two or more of such conductive materials. More particularly, the conductive material may be any one selected from natural graphite, artificial graphite, SUPER-P®, acetylene black, KETJEN BLACK, channel black, furnace black, lamp black, thermal black, denka black, aluminum powder, nickel powder, zinc oxide, potassium titanate and titanium dioxide, or a mixture of two or more such conductive materials.

The current collector is not particularly limited, as long as it causes no chemical change in the corresponding battery and has high conductivity. Particular examples of the current collector may include stainless steel, copper, aluminum, nickel, titanium, baked carbon, aluminum or stainless steel surface-treated with carbon, nickel, titanium or silver, or the like.

The binder resin may be a polymer used currently for an electrode in the art. Non-limiting examples of the binder resin include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, and carboxymethyl cellulose.

The electrode assembly prepared as described above may be introduced to a suitable casing and an electrolyte may be injected thereto to obtain a battery.

According to the present disclosure, the electrolyte is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), ester compounds and mixtures thereof. However, the present disclosure is not limited thereto.

In addition, the present disclosure provides a battery module which includes a battery including the electrode assembly as a unit cell, a battery pack including the battery module, and a device including the battery pack as an electric power source. Particular examples of the device include, but are not limited to: power tools driven by the power of an electric motor; electric cars, including electric vehicles (EV), hybrid electric vehicles (HEV), plug-in hybrid electric vehicles (PHEV), or the like; electric two-wheeled vehicles, including E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Porosity and Gurley Value

According to the present disclosure, porosity may be determined based on ASTM D-2873. Gurley values can be determined by using Gurley type Densometer (No. 158) available from Toyoseiki Co., according to the method of JIS (Japanese Industrial Standard) Gurley. In other words, the Gurley value means a time (second) required for 100 mL of air to pass through a porous substrate or separator having a size of 1 in$^2$ under a constant air pressure of 4.8 inches.

Particle Size Distribution

The average particle diameter of inorganic particles means the particle size ($D_{50}$) of 50% of the integrated value from a smaller particle diameter calculated based on the results of measurement of particle size distribution of the particles after the classification thereof using a conventional particle size distribution measuring system. For example, such particle size distribution can be determined after dispersing the inorganic particles sufficiently in aqueous solution by using a suitable laser diffraction or scattering type particle size distribution measuring system, followed by agitation with an ultrasonic dispersing device.

Specific Surface Area

Measurement of the BET specific surface area of inorganic particles may be carried out by the Brunauer-Emmett-Teller (BET) method. For example, a porosimetry analyzer (Bell Japan Inc., Belsorp-II mini) may be used to determine the specific surface area by the BET 6-dot method through nitrogen gas adsorption flowmetry.

EXAMPLES

1) Preparation of Porous Substrate

Each of the porous substrates according to Examples 1-1 to 1-3 was prepared by the following method. Polyethylene was prepared, and liquid paraffin oil having a dynamic viscosity of 40 cSt at 40° C. was used as a diluent. Herein, polyethylene and liquid paraffin oil were prepared at a weight ratio of 35:65. The ingredients were introduced to a biaxial extruder, kneaded therein and extruded at a temperature of 135° C. to obtain a polymer sheet. The sheet was elongated in the machine direction and the transverse direction each at a ratio of 5.5. The elongation temperature was about 120° C. Then, methylene chloride was used as an extraction solvent to extract liquid paraffin oil at 2 m/min. After that, the elongated polymer sheet was subjected to thermal fixing at 135° C. for 1 minute to obtain a porous polyolefin film.

In addition, each of Comparative Examples 1-1 to 1-3 was prepared by using a polyethylene film available from W-scope Co. Each of the porous substrates has the properties as shown in the following Table 1.

2) Determination of Physical Properties of Porous Substrate

Each of the porous substrates has the properties as shown in Table 1. In addition, each of the porous substrates according to examples 1-1 to 1-3 and Comparative Examples 1-1 to 1-3 was analyzed by differential scanning calorimetry (DSC). The results of peaks appearing upon the initial scanning are shown in FIG. 1. As can be seen from FIG. 1, each of the porous substrates according to Examples 1-1 to 1-3 shows two peaks of the first peaks and the second peak at 130° C. and 160° C., respectively, upon the initial scanning. Particularly, the second peak appears at a temperature beyond 145° C. in each Example. Meanwhile, only one peak is observed in each of the porous substrates according to Comparative Examples 1-1 to 1-3 over the whole temperature ranges upon the initial scanning. In addition, the A value was calculated according to the above Formula 4 after measuring the heat flow ($\Delta H1$) upon the initial scanning and the heat flow upon the second or later scanning ($\Delta H2$). As a result, it is shown that Examples 1-1 to 1-3 show an A value of 80% or more.

As can be seen from Table 1, the porous substrates according to Examples have higher porosity and smaller maximum pore size as compared to the porous substrates according to Comparative Examples. It is thought that this is because the porous substrates according to Examples have a smaller pore size and uniform distribution as compared to the porous substrates according to Comparative Examples. Therefore, it is shown that the porous substrates according to Examples show excellent resistance characteristics and ion conductivity. In addition, the porous substrates according to the present disclosure have high penetration strength in addition to excellent resistance characteristics. As can be seen from the results, the porous substrates according to Examples have high mechanical strength despite their high porosity, and thus provide improved durability and safety during use. Therefore, when external impact is applied to a battery or the internal temperature of a battery is increased rapidly, the separator is less damaged (e.g. tearing), thereby reducing a possibility of short-circuit generation. As a result, the porous substrates according to Examples show improved resistance characteristics and safety during use, thereby providing significantly improved electrochemical characteristics, such as output characteristics and cycle characteristics.

Meanwhile, the entangle molecular weight in Table 1 was determined by using rheological properties as described above. In addition, DSC analysis was carried out by scanning at least twice at a temperature of 30-200° C. and the results were analyzed by using Pyris S/W. The temperature-rising and temperature-dropping rate was 10° C./min for each time of scanning, wherein the temperature-dropping was carried out after the lapse of 10 minutes at 200° C. The DSC analysis was carried out at a temperature of 30-200° C. by scanning at least twice, wherein the temperature-rising and temperature-dropping rate was 10° C./min for each time of scanning and a pause of about 10 minutes might be set

TABLE 1

|  | Ex. 1-1 | Ex. 1-2 | Ex. 1-3 | Comp. Ex. 1-1 | Comp. Ex. 1-2 | Comp. Ex. 1-3 |
| --- | --- | --- | --- | --- | --- | --- |
| Molecular weight of polyethylene (Mw) | 340,000 | 320,000 | 320,000 | 340,000 | 340,000 | 340,000 |
| Entangle molecular weight (Me) | 807 | 1,203 | 1,803 | 3,734 | 2,805 | 3,013 |
| Ion conductivity (S/cm) | 1.09E−03 | 1.34E−03 | 1.34E−03 | 1.06E−03 | 1.06E−03 | 1.09E−03 |
| Thickness of porous substrate (μm) | 10.6 | 11.2 | 11.2 | 10.7 | 10.7 | 10.6 |
| Resistance (ohm) | 0.50 | 0.44 | 0.44 | 0.54 | 0.54 | 0.55 |
| Maximum pore size (nm) | 57.0 | 51.7 | 51.7 | 55.6 | 55.6 | 57.0 |
| Porosity of porous substrate (%) | 46.6 | 45.8 | 45.8 | 43.2 | 43.2 | 46.6 |
| Penetration strength (gf) | 545 | 530 | 493 | 485 | 450 | 477 | between temperature-rising and temperature-dropping. The results were analyzed by using Pyris S/W.

Preparation Example 1. Preparation of Separator Including Inorganic Coating Layer (1)

Water was mixed with ethanol at a weight ratio of 70:30 to prepare a dispersion medium. Then, 1 part by weight of carboxymethyl cellulose (CMC) was added thereto based on 100 parts by weight of the dispersion medium, followed by agitation for about 1 hour, to obtain a homogeneous mixture. Inorganic particles ($Al_2O_3$) and acrylic copolymer (Sigma Aldrich) were introduced to and dispersed in the mixture to obtain slurry for an inorganic coating layer. The inorganic particles (a) and the binder resin (b), i.e., acrylic binder and carboxymethyl cellulose, were mixed at a weight ratio of a:b of 94:6 in the slurry. In addition, the solid content of inorganic particles (a) and binder resin (b) was about 20 wt % based on 100 wt % of the slurry. The slurry was applied to one surface of the porous substrate through a slot die coating process and dried naturally to obtain a separator having an inorganic coating layer formed on one surface of the separator. The physical properties of the porous substrates and inorganic particles used for Examples and Comparative Examples are shown in the following Tables 2 and 3.

according to Examples 1-3 maintains an increase in resistance of 0.05 ohm or less, even when an inorganic coating layer is formed to supplement physical strength and heat resistance. Therefore, the separator according to the present disclosure not only has a small thickness and low resistance characteristics but also shows excellent durability and heat resistance, and thus can provide improved output characteristics and high energy density, when it is applied to a battery.

Preparation Example 2. Preparation of Separator Including Inorganic Coating Layer (2)

Water was mixed with ethanol at a weight ratio of 70:30 to prepare a dispersion medium. Then, 1 part by weight of carboxymethyl cellulose (CMC) was added thereto based on 100 parts by weight of the dispersion medium, followed by agitation for about 1 hour, to obtain a homogeneous mixture. Inorganic particles ($Al(OH)_3$) and acrylic copolymer (Sigma Aldrich) were introduced to and dispersed in the mixture to obtain slurry for an inorganic coating layer. In example 4, the inorganic particles (a) and the binder resin (b), i.e., acrylic binder and carboxymethyl cellulose, were mixed at a weight ratio of a:b of 94:6 in the slurry. Meanwhile, in Comparative Example 4, the inorganic particles (a) and the binder resin (b), i.e., acrylic binder and carboxymethyl cellulose, were mixed at a weight ratio of a:b of 88:12 in the

TABLE 2

| | Inorganic particles ($Al_2O_3$) Particle diameter (μm) | BET ($m^2$/g) | Inorganic coating Porous substrate | Ratio (%) of inorganic coating layer thickness (μm) | Increase in resistance coating layer thickness to separator thickness | Resistance (ohm) per (ohm) after coating inorganic coating layer (absolute value of resistance increase) | 1 μm of inorganic coating layer thickness |
|---|---|---|---|---|---|---|---|
| Ex. 2-1 | $D_{90}$: 2.17 $D_{50}$: 0.47 | 7-8 | Ex. 1-1 | 2.2 | 17% | 0.03 | 0.005 |
| Ex. 2-2 | $D_{90}$: 2.17 $D_{50}$: 0.47 | 7-8 | Ex. 1-2 | 0.8 | 7% | 0.02 | 0.25 |
| Ex. 2-3 | $D_{90}$: 2.17 $D_{50}$: 0.47 | 7-8 | Ex. 1-3 | 2.1 | 16% | 0.05 | 0.24 |
| Comp. Ex. 2-1 | $D_{90}$: 2.17 $D_{50}$: 0.47 | 7-8 | Comp. Ex. 1-1 | 2.3 | 17% | 0.06 | 0.026 |
| Comp. Ex. 2-2 | $D_{90}$: 2.17 $D_{50}$: 0.47 | 7-8 | Comp. Ex. 1-2 | 1.5 | 12% | 0.05 | 0.033 |
| Comp. Ex. 2-3 | $D_{90}$: 2.17 $D_{50}$: 0.47 | 7-8 | Comp. Ex. 1-3 | 3.1 | 23% | 0.07 | 0.019 |

The resistance of each of the separators according to Examples 2-1 to 2-3 and Comparative Examples 2-1 to 2-3 is shown in the following Table 3.

TABLE 3

| | Ex. 2-1 | Ex. 2-2 | Ex. 2-3 | Comp. Ex. 2-1 | Comp. Ex. 2-2 | Comp. Ex. 2-3 |
|---|---|---|---|---|---|---|
| Total resistance of separator (ohm) | 0.53 | 0.46 | 0.46 | 0.60 | 0.59 | 0.57 |

The separators according to Examples 2-1 to 2-3 show a resistance of 0.55 ohm or less. Particularly, the separators slurry. In addition, the solid content of inorganic particles (a) and binder resin (b) was about 20 wt % based on 100 wt % of each slurry.

The slurry was applied to one surface of the porous substrate through a slot die coating process and dried naturally to obtain a separator having an inorganic coating layer formed on one surface of the separator. The physical properties of the porous substrate (Example 1-1) and inorganic particles used for Example 4 and Comparative Example 4 are shown in the following Tables 4 and 5. The properties of the porous substrate used for Preparation Example 2 are shown in the following Table 4. In addition, the physical properties of each separator are shown in the following Table 5.

TABLE 4

| Material | Ion conductivity (S/cm) | Molecular weight (Mw) | Porosity (%) | Mean pore size (nm)/ maximum pore size (nm) | Thickness (μm) | Resistance (ohm) |
|---|---|---|---|---|---|---|
| Polyethylene | 1.09E−03 | 340,000 | 46.6 | 35.3/57.0 | 10.6 | 0.50 |

TABLE 5

| | Inorganic particles (Al(OH)$_3$) | | Inorganic coating layer thickness (μm) | Ratio (%) of inorganic coating layer thickness to separator thickness | Increase in resistance (ohm) after coating inorganic coating layer (absolute value of resistance increase) | Resistance (ohm) per 1 μm of inorganic coating layer thickness | Total resistance (ohm) of separator |
|---|---|---|---|---|---|---|---|
| | Particle diameter (μm) | BET (m$^2$/g) | | | | | |
| Ex. 4 | D$_{90}$: 0.97<br>D$_{50}$: 0.56 | 13.8 | 2.4 | 18% | 0.03 | 0.012 | 0.53 |
| Comp. Ex. 4 | D$_{90}$: 0.97<br>D$_{50}$: 0.56 | 13.8 | 2.4 | 18% | 0.09 | 0.037 | 0.59 |

As can be seen from Example 4 and Comparative Example 4, when the content of binder in the inorganic coating layer is larger than 10 wt %, resistance is highly increased after coating the inorganic coating layer, resulting in degradation of resistance characteristics of the finished separator.

According to the present disclosure, resistance and ion conductivity were measured by the following method. Each of the separators according to Examples and Comparative Examples was cut adequately and introduced to a coin cell (diameter 20 mm, thickness 1.6 mm), and an electrolyte was injected thereto and the coin cell was allowed to stand for 4 hours or more so that the separator might be impregnated sufficiently with the electrolyte. Then, 1470E Cell test system (Solatron) and Frequency Response Analyzer 1255B (Solatron) were used to determine resistance and ion conductivity. Resistance was determined by measuring impedance at a predetermined frequency and the measurement points were connected linearly to make a plot, wherein the x-intercept of the plot was taken as the resistance of the separator. Herein, the frequency was 100,000-10,000 Hz. In addition, the reciprocal number of the resistance value determined as mentioned above was taken as ion conductivity.

Preparation Example 3. Manufacture of Battery (Example 5 and Comparative Example 5)

Each of the separators according to Example 2-1 and Comparative Example 2-2 was used to obtain a battery. The battery using the separator according to Example 2-1 was Example 5 and the battery using the separator according to Comparative Example 2-2 was Comparative Example 5. Each battery was obtained by the following method.

First, a positive electrode active material (LiNi$_{0.6}$Co$_{0.2}$Mn$_{0.2}$O$_2$), a conductive material (FX35) and a binder (PVDF) were introduced to a solvent (NMP) at a weight ratio of 95:2:3 and mixed (2000 rpm, 30 minutes) to prepare positive electrode slurry. The prepared positive electrode slurry was applied to aluminum foil having a thickness of 20 μm by using a doctor blade and dried at 110° C. overnight. The positive electrode was controlled to a thickness of about 100-110 μm and a pressing machine (roll press) was used to carry out pressing so that the positive electrode might have a final thickness of about 60-70 μm. The obtained electrode was allowed to stand in a vacuum drier at 80° C. for 4 hours.

Next, a negative electrode was prepared. A negative electrode active material (graphite), a conductive material (SUPER P®) and a binder (CMC/SBR, mixed at a weight ratio of 1:1) were introduced to a solvent (water) at a weight ratio of 97.5:1.5:1 (wt %) and mixed (2000 rpm, 30 minutes) to prepare negative electrode slurry. The prepared negative electrode slurry was applied to copper foil having a thickness of 20 μm by using a doctor blade and dried at 110° C. overnight. The negative electrode was controlled to a thickness of about 100-110 μm and a pressing machine (roll press) was used to carry out pressing so that the negative electrode might have a final thickness of about 60-70 μm. The obtained electrode was allowed to stand in a vacuum drier at 80° C. for 4 hours. Then, the separator, positive electrode, separator and the negative electrode were stacked successively and laminated to obtain an electrode assembly sheet. Each separator had an inorganic coating layer formed on one surface of the porous substrate and was disposed in such a manner that the inorganic coating layer of each separator might face the positive electrode. Then, the sheet was wound in such a manner that the negative electrode might face outward to obtain a jelly-roll type electrode assembly. The obtained electrode assembly was introduced to a battery casing and an electrolyte was injected thereto to obtain a battery. The electrolyte includes 1M LiPF$_6$ dissolved in a mixed solvent containing ethylene carbonate (EC) and diethyl carbonate (DEC) (volume ratio 1:1).

Evaluation of Charge/Discharge Characteristics of Battery

Figure 2:
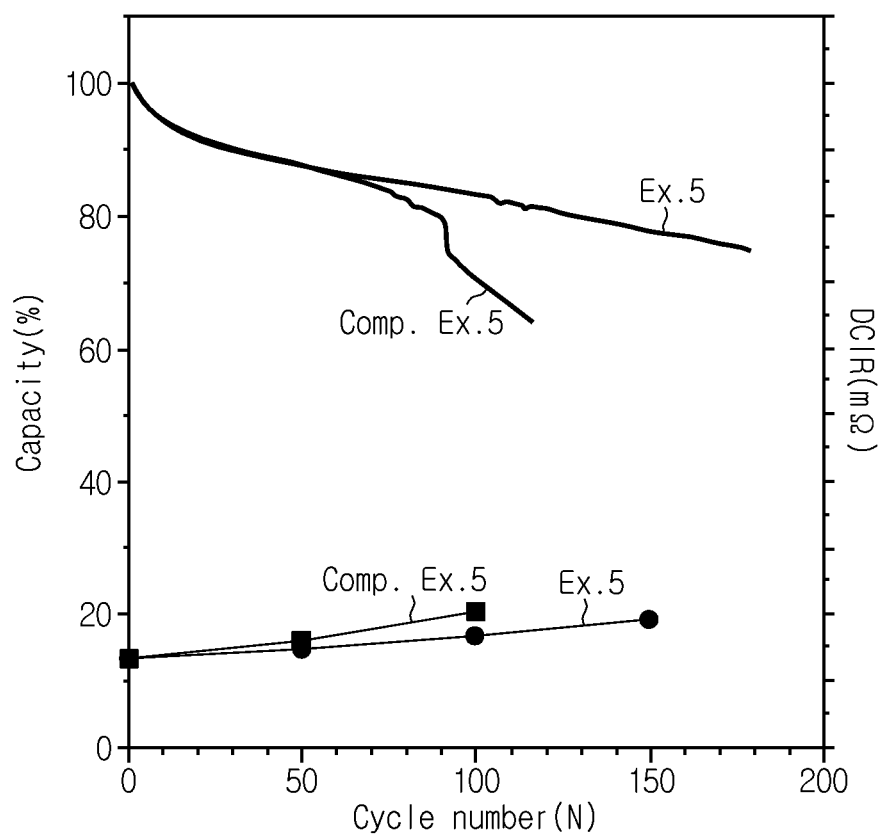
FIG. 2 is a graph illustrating the cycle characteristics of the battery according to Example 5 as compared to those of the battery according to Comparative Example 5.

FIG. 2 shows the cycle test results of each of the batteries according to Example 5 and Comparative Example 5 under the condition of charging at 1.5 C and discharging at 10 C, and the test results include capacity retention (left side) and DCIR (mΩ) (right side). In addition, the following Table 6 shows measurement of DCIR (mΩ) during 100 charge/discharge cycles. Example 5 shows an initial resistance of 13.36 mΩ and Comparative Example 5 shows a similar initial resistance of 13.58 mΩ. However, in terms of the resistance at the 100$^{th}$ charge/discharge cycle, Comparative Example 5 shows an increased resistance of about 20.4 mΩ at around the 100$^{th}$ cycle (Table 3) and causes rapid cycle fading. On the contrary, Example 5 shows a resistance of 16.8 mΩ at the 100$^{th}$ cycle, suggesting that it has excellent resistance characteristics as compared to Comparative Example 5. In addition, it can be seen that the battery according to Example shows higher capacity retention.

TABLE 6

|  | 0 cycle | 50$^{th}$ cycle | 100$^{th}$ cycle |
|---|---|---|---|
| Comp. Ex. 5 DCIR (mΩ) | 13.58 | 15.92 | 20.36 |
| Ex. 5 DCIR (mΩ) | 13.36 | 15.00 | 16.77 |

What is claimed is:

1. A separator for an electrochemical device comprising:
   a porous substrate,
   wherein the porous substrate has a porosity of 40% to 70%,
   wherein the porous substrate has a mean pore size of 20 nm to 35 nm,
   wherein the porous substrate comprises polyethylene having a weight average molecular weight in a range of 200,000 to 500,000, and
   wherein the polyethylene has an entangle molecular weight of 2,500 g/mol or less, and
   wherein the porous substrate has two peaks comprising a first peak at 130° C. to less than 145° C. and a second peak at 145° C. to 160'C upon an initial scanning in a differential scanning calorimetry (DSC) curve, and
   wherein the second peak appears only upon the initial scanning in DSC analysis and is not identified upon a second or later scanning.

2. The separator for the electrochemical device according to claim 1, wherein the porous substrate has a resistance of 0.5 ohm or less.

3. The separator for the electrochemical device according to claim 1, wherein the porous substrate has a penetration strength of 490 gf or more.

4. The separator for the electrochemical device according to claim 1, wherein the porous substrate has an A value of 50% or more as calculated by the following Formula 4 in the DSC curve, wherein ΔH1 represents heat flow upon the initial scanning and ΔH2 represents heat flow upon the second or later scanning:

$$A(\%)=(\Delta H1-\Delta H2)/\Delta H2.$$ [Formula 4]

5. The separator for the electrochemical device according to claim 1, wherein the porous substrate has a largest pore diameter of 20 nm to 70 nm.

6. The separator for the electrochemical device according to claim 1, wherein the porous substrate has a thickness of 5 μm to 14 μm.

7. The separator for the electrochemical device according to claim 1, wherein the polyethylene has a melting point less than 200° C.

8. The separator for the electrochemical device according to claim 1, further comprising an inorganic coating layer formed on at least one surface of the porous substrate,
   wherein the inorganic coating layer comprises inorganic particles and a binder resin, and the inorganic particles and the binder resin are present in the inorganic coating layer at a weight ratio of 99.9:0.1 to 90:10.

9. The separator for the electrochemical device according to claim 8, wherein the separator having the inorganic coating layer coated on the surface has a resistance of 0.55 ohm or less.

10. The separator for the electrochemical device according to claim 8, wherein the inorganic coating layer has a thickness of 2.5 μm or less.

11. An electrode assembly for the electrochemical device comprising:
    a negative electrode;
    a positive electrode; and
    a separator interposed between the negative electrode and the positive electrode,
    wherein the separator is the same as defined in claim 1.

12. A method for manufacturing the separator for the electrochemical device as defined in claim 1, the method comprising the step of:
    preparing the porous substrate by carrying out thermal fixing at a temperature of 130° C. or higher.

13. A method for manufacturing the separator for the electrochemical device as defined in claim 8, the method comprising the steps of:
    preparing a slurry for the inorganic coating layer,
    wherein the slurry for the inorganic coating layer comprises a binder resin, a dispersion medium and inorganic particles;
    applying the slurry to at least one surface of the porous substrate;
    drying the porous substrate having the slurry on at least one surface,
    wherein the porous substrate is prepared by carrying out thermal fixing at a temperature of 130° C. or higher.

14. The method for manufacturing the separator for the electrochemical device according to claim 13, wherein the slurry is an aqueous slurry comprising:
    the binder resin; and
    the inorganic particles,
    wherein the inorganic particles are dispersed in the dispersion medium comprising water and/or ethanol.

* * * * *